US009604698B2

(12) United States Patent
Tsai et al.

(10) Patent No.: US 9,604,698 B2
(45) Date of Patent: Mar. 28, 2017

(54) BICYCLE COGSET

(71) Applicant: TIEN HSIN INDUSTRIES CO., LTD., Taichung (TW)

(72) Inventors: Wen-Feng Tsai, Taichung (TW); Wen-Nan Liao, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 246 days.

(21) Appl. No.: 14/520,789

(22) Filed: Oct. 22, 2014

(65) Prior Publication Data

US 2016/0114859 A1    Apr. 28, 2016

(51) Int. Cl.
*B62M 9/10* (2006.01)
*F16H 55/30* (2006.01)

(52) U.S. Cl.
CPC ............... *B62M 9/10* (2013.01); *F16H 55/30* (2013.01)

(58) Field of Classification Search
CPC ............ B62M 9/10; F16H 55/30; F16H 55/14
USPC .......................................... 474/160
See application file for complete search history.

(56) References Cited

U.S. PATENT DOCUMENTS

| 3,733,921 | A | * | 5/1973 | Carveth | ................. | F16H 55/06 |
|           |   |   |        |         |                  | 29/893.37  |
| 5,852,951 | A | * | 12/1998 | Santi | ..................... | F16H 55/06 |
|           |   |   |        |       |                      | 264/273    |
| 7,814,809 | B2 | * | 10/2010 | Shinohara | ............... | F16H 55/06 |
|           |    |   |         |           |                    | 74/409     |
| 8,764,594 | B2 | * | 7/2014 | Dal Pra' | .................. | F16H 55/30 |
|           |    |   |        |          |                    | 474/160    |
| 2007/0265122 | A1 | * | 11/2007 | Emura | .................... | B62M 9/105 |
|              |    |   |         |       |                      | 474/152    |
| 2010/0009794 | A1 | * | 1/2010 | Chiang | ..................... | B62M 9/10 |
|              |    |   |        |        |                      | 474/160   |
| 2015/0285358 | A1 | * | 10/2015 | Numata | ................... | F16H 55/08 |
|              |    |   |         |        |                      | 474/160    |
| 2015/0291255 | A1 | * | 10/2015 | Nishimoto | ............... | B62M 9/06 |
|              |    |   |         |           |                    | 474/152   |
| 2015/0360749 | A1 | * | 12/2015 | Iwai | ........................ | F16H 55/30 |
|              |    |   |         |      |                          | 474/158    |

FOREIGN PATENT DOCUMENTS

TW            M451318         4/2013

* cited by examiner

*Primary Examiner* — William E Dondero
*Assistant Examiner* — Mark K Buse
(74) *Attorney, Agent, or Firm* — WPAT, PC; Justin King

(57) ABSTRACT

A bicycle cogset comprises a sprocket base, a first sprocket, and a second sprocket. A periphery of the sprocket base is provided with a plurality of connecting arms, and each of the connecting arms is provided with at least one first and one second connection hole respectively. The first sprocket has a first outer portion and a first inner portion, the first outer portion provided with a plurality of first teeth, the first inner portion provided with a plurality of first insertion members, and the first insertion members disposed in the first connection holes. The second sprocket has a second outer portion and a second inner portion, the second outer portion provided with a plurality of second teeth, the second inner portion provided with a plurality of second insertion members, and the second insertion members disposed in the second connection holes.

9 Claims, 8 Drawing Sheets

BICYCLE COGSET

BACKGROUND

Field of the Invention

The present invention relates to a bicycle cogset, and in particular, to a bicycle cogset that can be modularized and helps quickly and integrally assemble a plurality of sprockets.

Description of Related Art

Generally, a rear cogset of a variable-speed bicycle has multiple rear sprockets with different sizes assembled on it, and these sprockets are assembled together on a sleeve, where the sleeve is sleeved on a rear hub, and the rear hub is connected to a rear wheel of the bicycle. Pedaling pedals of the bicycle drives a front chainwheel to rotate, the front chainwheel is connected to the rear cogset by a chain hanging thereon, and the chain can be moved by a derailleur of the bicycle to move between two different sprockets of the rear cogset according to a different road condition, so as to drive the bicycle to move forward.

FIG. 1 and FIG. 2 show a bicycle cogset according to Taiwan utility model patent No. M451318, including a base 60, a plurality of fixing members 70, a large sprocket 80 with a largest outer diameter, a first sprocket 90, a second sprocket 91, a third sprocket 92, and a fourth sprocket 93. The base 60 has a cylindrical body 61, an outer portion of the body 61 is provided with six supporting arms 62, each of the supporting arms 62 has a first surface 63 and a second surface 64 that are opposite to each other, the second surface 64 is provided with a first step portion 641 and a second step portion 642 that are in a staircase shape, the thickness of the first step portion 641 is greater than that of the second step portion 642, and each of the first step portion 641 and the second step portion 642 is provided with a through hole 65. The first surface 63 is used for mounting the large sprocket 80, and a plurality of mounting holes 81 are disposed to correspond to the through hole 65 of the first step portion 641. The first sprocket 90, the second sprocket 91, the third sprocket 92, and the fourth sprocket 93 are disposed sequentially in a direction of the second surface 64. The first sprocket 90, the second sprocket 91, the third sprocket 92, and the fourth sprocket 93 are provided with a plurality of mounting holes 901, 911, 921, and 931 respectively to correspond to the fixing members 70. The fixing members 70 has a large-diameter portion 71, a long shaft 72, and a short shaft 73, so that the first sprocket 90 is riveted by the long shaft 72 of the fixing member 70 through the mounting hole 911, the fixing member 70 passes through the mounting hole 911 of the second sprocket 91, the through hole 65 of the first step portion 641, and the mounting hole 81 of the large sprocket 80, and finally rivets the large sprocket 80 to the first surface 63.

The third sprocket 92 and the fourth sprocket 93 are riveted and fixed by the short shaft 73 of the fixing member 70 by passing through the mounting hole 921 of the third sprocket 92, and by the long shaft 72 by passing through the mounting hole 931 of the fourth sprocket 93 and the through hole 65 of the supporting arm 62. As a result, the first sprocket 90, the second sprocket 91, the third sprocket 92, the fourth sprocket 93, and the large sprocket 80 are passed through and riveted by the plurality of fixing members 70, and are fixed together with the base 60.

In assembly, manual work is required, so that one end of the fixing member 70 passes through the mounting hole 901 of the first sprocket 90, and the other end passes through the mounting hole 911 of the second sprocket 91 and the through hole 65 of the first step portion 641 and is riveted to the first surface 63; and the short shaft 73 of the fixing member 70 passes through the mounting hole 921 of the third sprocket 92 and is riveted to and fixed on the third sprocket 92, and the long shaft 72 of the fixing member 70 passes through the mounting hole 931 of the fourth sprocket 93 and the through hole 65 of the supporting arm 62, and is riveted to the fourth sprocket 93 and the supporting arm 62. It can be seen from the above that the assembly process is quite time-consuming and troublesome, and the matching precision of the elements is difficult to control, which do not satisfy economical requirements.

SUMMARY

In view of this, a main objective of the present invention is to provide a bicycle cogset that can be modularized precisely and rapidly, to prevent time-consuming and troublesome riveting and bring an economic benefit.

Another objective of the present invention is to provide a bicycle cogset that has a simple structure with fewer parts and lighter weight, and further reduces material usage and manual assembly costs.

To achieve the foregoing objectives, the present invention discloses a bicycle cogset disposed on a sleeve of a rear hub of a bicycle, comprising a sprocket base, a first sprocket, and a second sprocket. The sprocket base has a combination hole used for combining with the sleeve, where a periphery of the sprocket base is provided with a plurality of connecting arms, and each of the connecting arms is provided with at least one first connection hole and at least one second connection hole. The first sprocket has a first outer portion and a first inner portion, where the first outer portion is provided with a plurality of first teeth, the first inner portion is provided with a plurality of first insertion members, and the first insertion members are disposed in the first connection holes. The second sprocket has a second outer portion and a second inner portion, the second outer portion is provided with a plurality of second teeth, the second inner portion is provided with a plurality of second insertion members, and the second insertion members are disposed in the second connection holes.

The present invention has at least the following advantages:

1. In the bicycle cogset of the present invention, the first sprocket and the second sprocket are placed in advance in a mould for mold filling, and when the sprocket base is formed, the first insertion member of the first sprocket and the second insertion member of the second sprocket are integrated after being clad by the connecting arms of the sprocket base. In this way of combination, modularization can be implemented accurately and rapidly in manufacturing, thereby completely preventing time-consuming and troublesome riveting. Therefore, costs can be reduced, an economic benefit can be brought, and great industrial applicability can be achieved.

2. The present invention has a simple structure with few parts, and the first sprocket, the second sprocket, and the sprocket base do not need to be connected together in a riveting manner. As a result, compared with the prior art, the present invention is lighter in weight, saves the material and assembly costs, and is quite competitive in the market. In addition, the sprocket base may be made of an Acrylonitrile Butadiene Styrene (ABS) material, a carbon fiber material, or a thermosetting resin material. Therefore, the present invention is further advantageous in lighter weight and cost reduction compared with an ordinary one made of metal.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Selected embodiments of the present invention will now be explained with reference to the drawings, but it should be noted that, the embodiments are merely exemplary, and should not be explained as a limitation to the implementation of the present invention.

Figure 4:
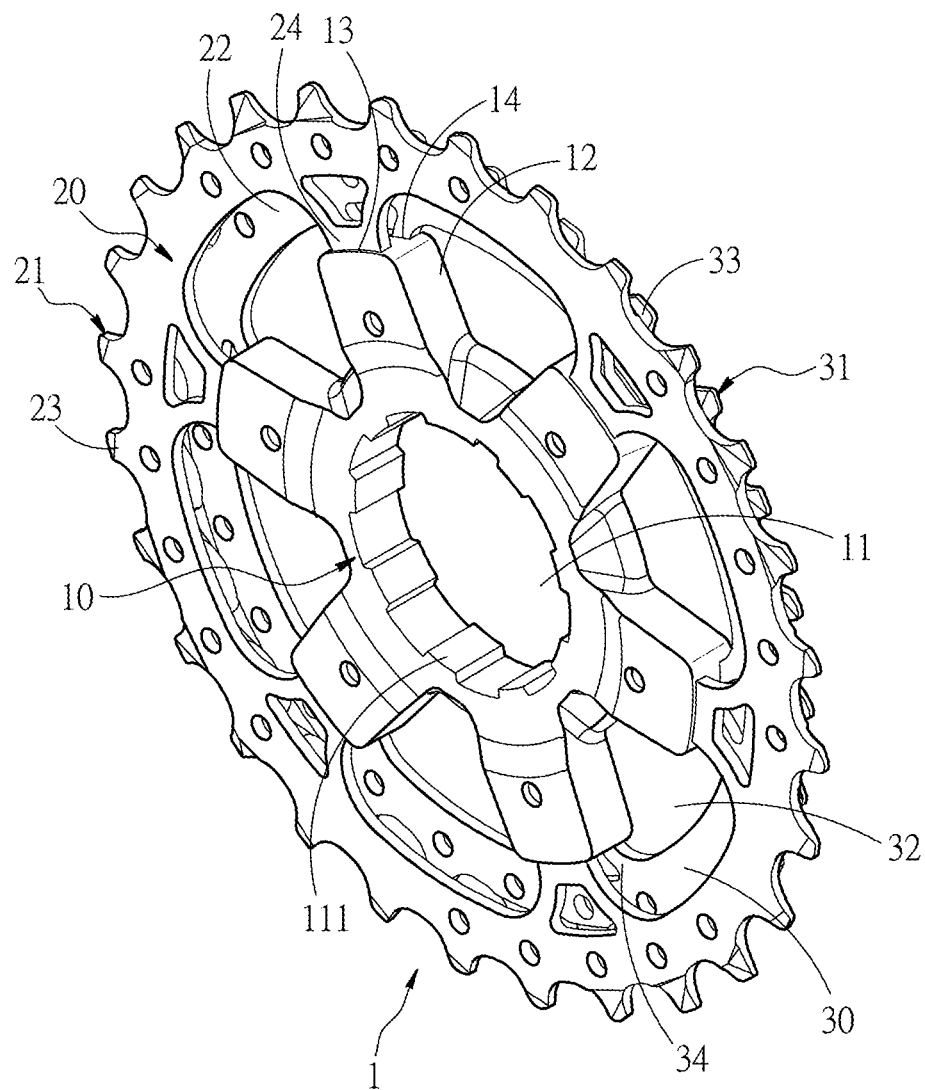
FIG. 4 is a three-dimensional structural diagram according to the embodiment of the present invention.
Figure 5:
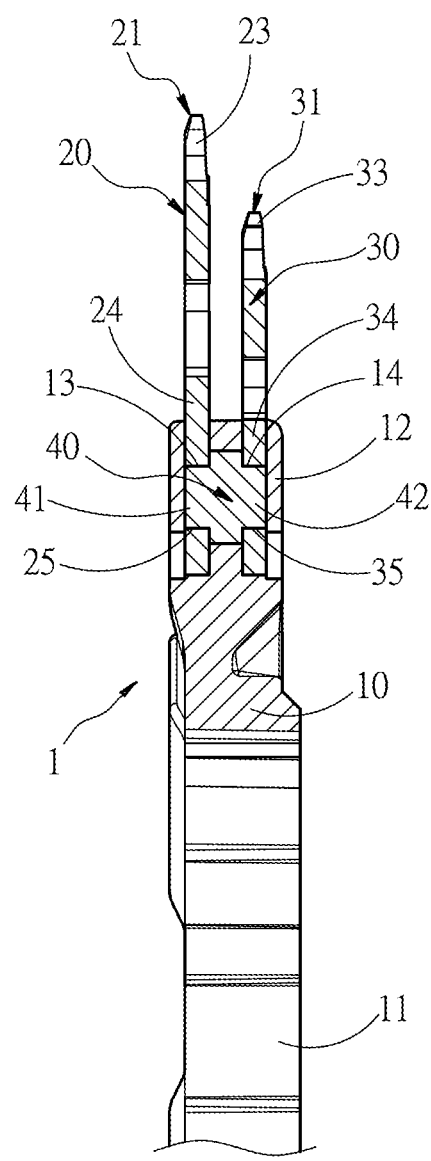
FIG. 5 is a partial structural sectional view according to the embodiment of the present invention.
Figure 6:
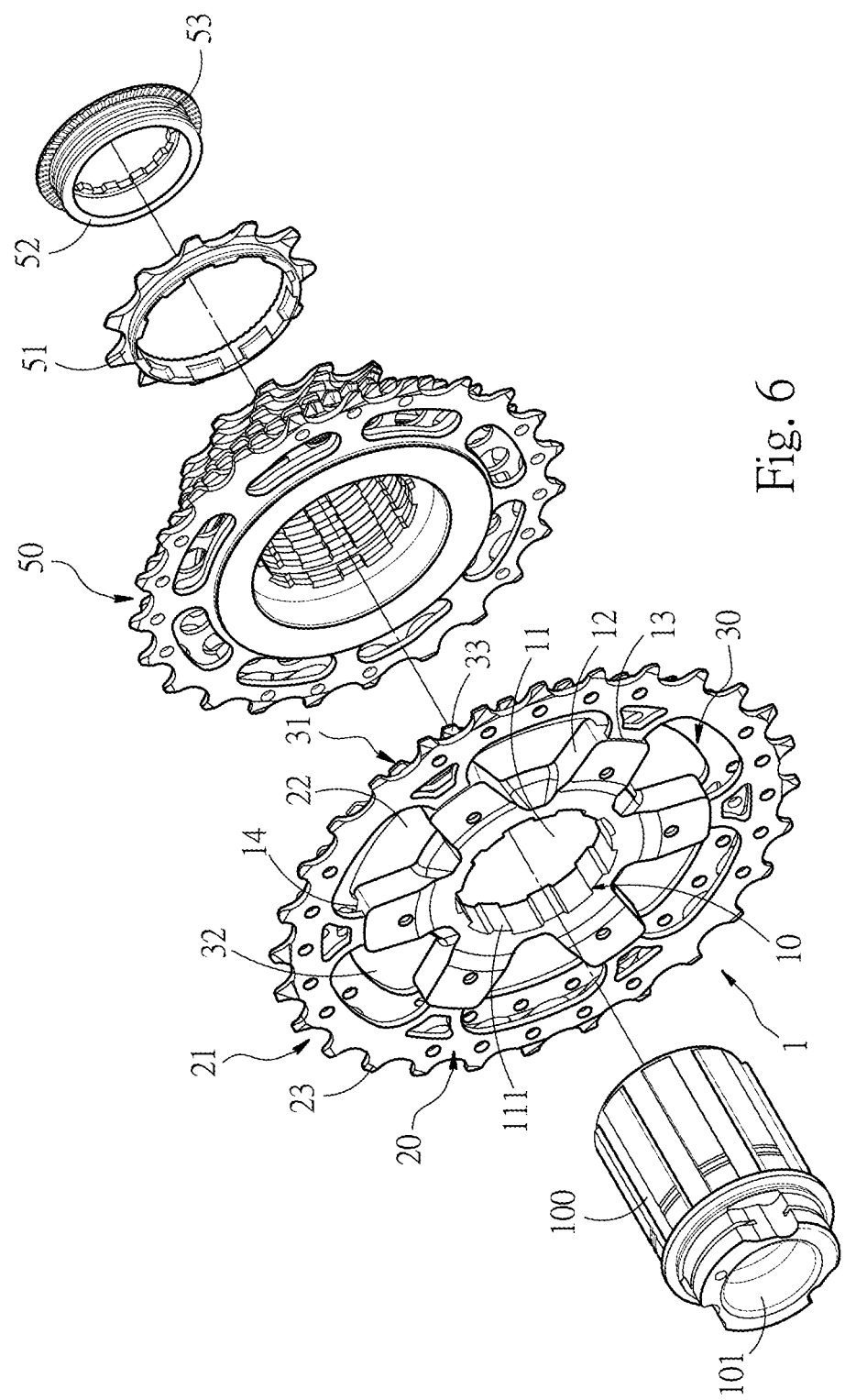
FIG. 6 is an exploded three-dimensional diagram of assembling the cogset with a hub of a bicycle according to the embodiment of the present invention.

Referring to FIG. 3 to FIG. 6, FIG. 3 is an exploded three-dimensional diagram according to an embodiment of the present invention, FIG. 4 is a three-dimensional structural diagram according to the embodiment of the present invention, FIG. 5 is a partial structural sectional view according to the embodiment of the present invention, and FIG. 6 is an exploded three-dimensional diagram of assembling a cogset 1 with a sleeve 100 of a hub of a bicycle according to the embodiment of the present invention. The present invention discloses the bicycle cogset 1, including a sprocket base 10, a first sprocket 20, a second sprocket 30, and a plurality of connecting elements 40. The sprocket base 10 is made of a nonmetallic material, for example, it can be ABS, carbon fiber, or thermosetting resin materials, and in the present embodiment, the ABS is selected. A combination hole 11 is formed in the center of the sprocket base 10 with a plurality of protrusions 111 disposed around the combination hole 11, and the sprocket base 10 is combined with the sleeve 100 of a rear hub of a bicycle through the combination hole 11. An outer portion of the sprocket base 10 has a plurality of connecting arms 12 that extend outwards in a radial direction, an end of each of the connecting arms 12 far away from a circle center is provided with at least one first connection hole 13 and at least one second connection hole 14, and in the present embodiment, the first connection hole 13 and the second connection hole 14 are rectangular.

The first sprocket 20 has a first outer portion 21 and a first inner portion 22. A plurality of first teeth 23 are disposed on the first outer portion 21, a plurality of first insertion members 24 are disposed on the first inner portion 22 and inserted in the first connection holes 13, the plurality of first insertion members 24 extends from the first inner portion 22 of the first sprocket 20 to a circle center of the first sprocket 20 in a radial direction, and each of the first insertion members 24 is provided with a first pin hole 25.

Similarly, the second sprocket 30 has a second outer portion 31 and a second inner portion 32. A plurality of second teeth 33 are disposed on the second outer portion 31, a plurality of second insertion members 34 are disposed on the second inner portion 32 and inserted in the second connection holes 14, the plurality of second insertion members 34 extends from the second inner portion 32 of the second sprocket 30 to a circle center of the second sprocket 30 in a radial direction, each of the second insertion members 34 is provided with a second pin hole 35, and the first insertion member 24 and the second insertion member 34 are inserted respectively to the connecting arms 12.

An outer diameter of the first sprocket 20 is larger than that of the second sprocket 30, and the number of the first teeth 23 of the first sprocket 20 is greater than the number of the second teeth 33 of the second sprocket 30.

The connecting elements 40 are columnar, a flange 41 is disposed in the center of each connecting element 40, with a first pin 42 and a second pin 43 extended respectively from two sides of the flange 41. An outer diameter of the flange 41 is larger than an outer diameter of the first pin 42 and an outer diameter of the second pin 43.

In manufacture, the first pin 42 is disposed in the first pin hole 25 of the first sprocket 20, and the second pin 43 is disposed in the second pin hole 35 of the second sprocket 30. Accordingly, the first sprocket 20 and the second sprocket 30 are connected by the connecting elements 40 in a non-riveting manner, and then the whole assembly of the first sprocket 20, the connecting elements 40 and the second sprocket 30 is placed in a mould for filling ABS material to form the sprocket base 10. When the sprocket base 10 is formed, the first insertion members 24 and the second insertion members 34 are clad by the ABS and form connecting arms 12. The first insertion members 24, the second insertion members 34, and the connecting elements 40 are clad together and are fixed tightly, and the connecting elements 40 are completely embedded in the sprocket base 10. When the first sprocket 20 and the second sprocket 30 are integrated with the sprocket base 10 by filling the ABS into the mould, they are inseparably combined together after the sprocket base 10 is formed and solidified.

In this way of combination, modularization can be implemented accurately and rapidly in manufacturing, thereby completely preventing time-consuming and troublesome riveting. Therefore, costs can be reduced, an economic benefit can be brought, and great industrial applicability can be achieved.

Figure 7:
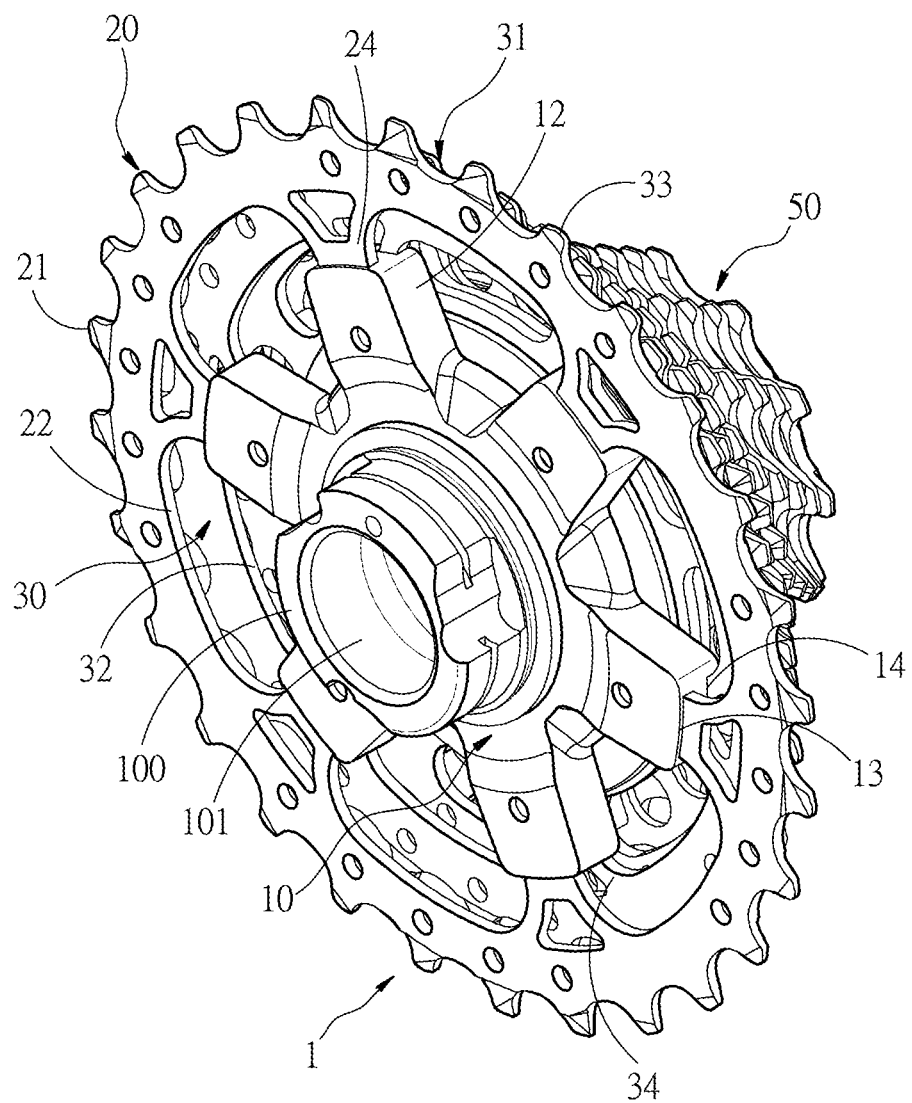
FIG. 7 is a three-dimensional structural diagram of assembling the cogset with the hub of the bicycle according to the embodiment of the present invention.
Figure 8:
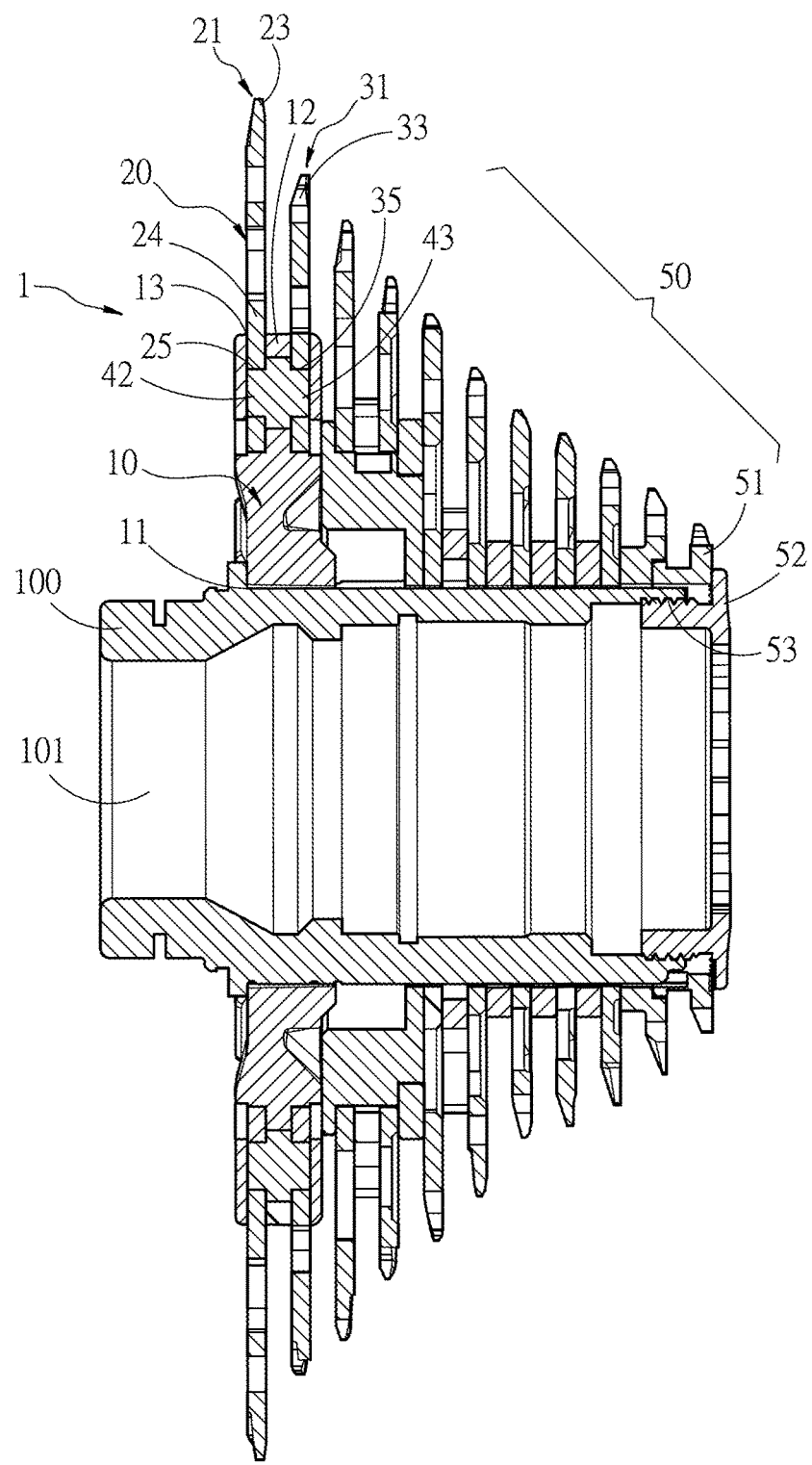
FIG. 8 is a structural sectional view of assembling the cogset with the hub of the bicycle according to the embodiment of the present invention.

Following will introduce how the present invention assembled to the hub. Please refer to FIG. 6 to FIG. 8. FIG. 6 is an exploded three-dimensional diagram of assembling the cogset 1 with the sleeve 100 in the sequence of the cogset 1, a freewheel 50, a smallest sprocket 51 and a lock cover 52. FIG. 7 is a three-dimensional structural diagram of assembling the cogset 1 with the sleeve 100 of the hub according to the embodiment of the present invention. FIG. 8 is a structural sectional view of assembling the cogset 1 with the sleeve 100 of the hub according to the embodiment of the present invention. After assembling the cogset 1 with the sleeve 100, the freewheel 50 includes a plurality of sprockets of different sizes assembled to the sleeve 100, and the sprockets are sequentially assembled on the sleeve 100 according to the sizes of the sprockets, and are fastened together by screwing the lock cover 52 at an outer side of the smallest sprocket 51 into a central hole 101 of the sleeve 100 by using an outer thread 53 on the lock cover 52.

Figure 1:
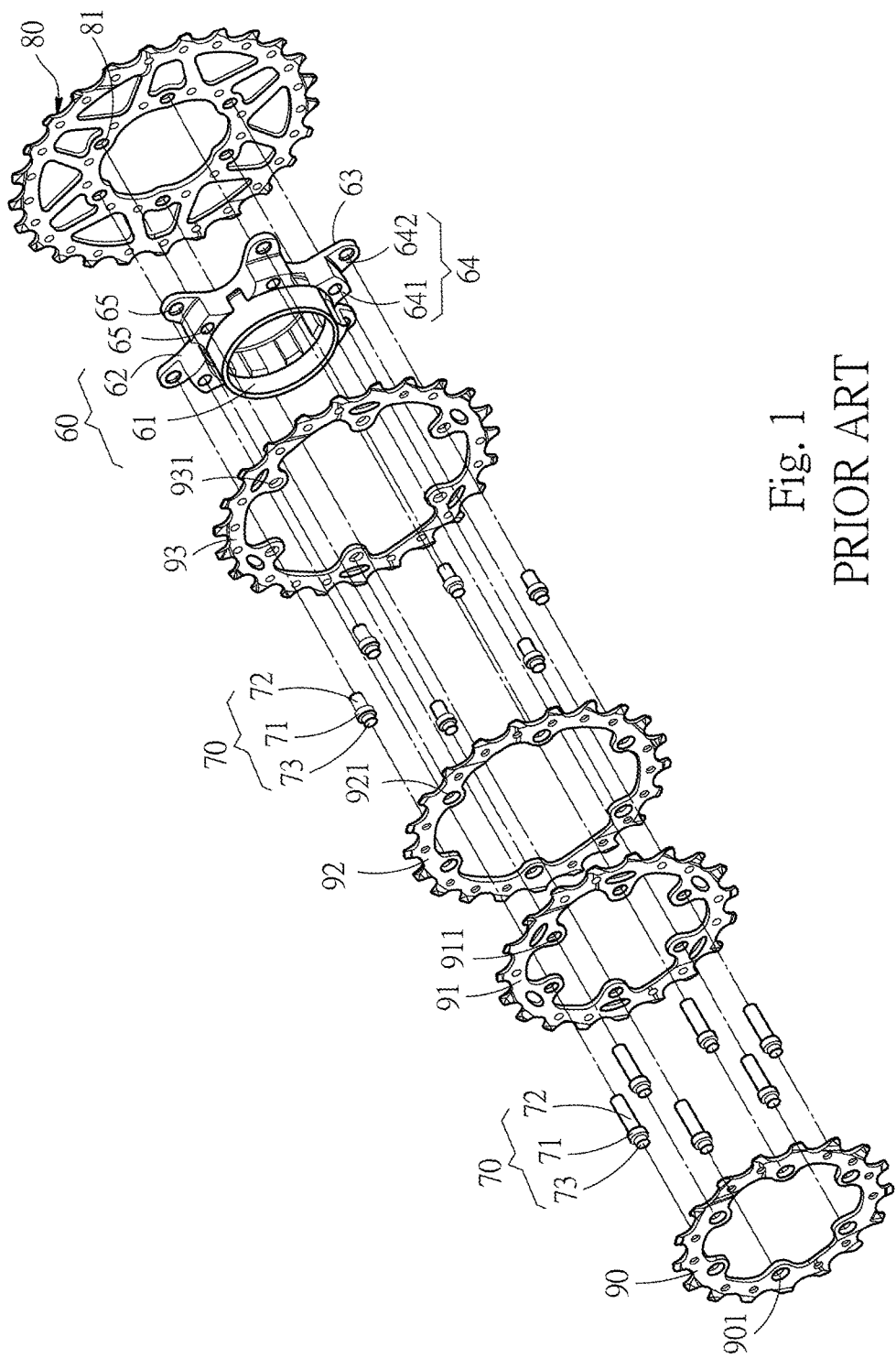
FIG. 1 is an exploded three-dimensional diagram of a bicycle cogset according to Taiwan utility model patent No. M451318 in the prior art.
Figure 2:
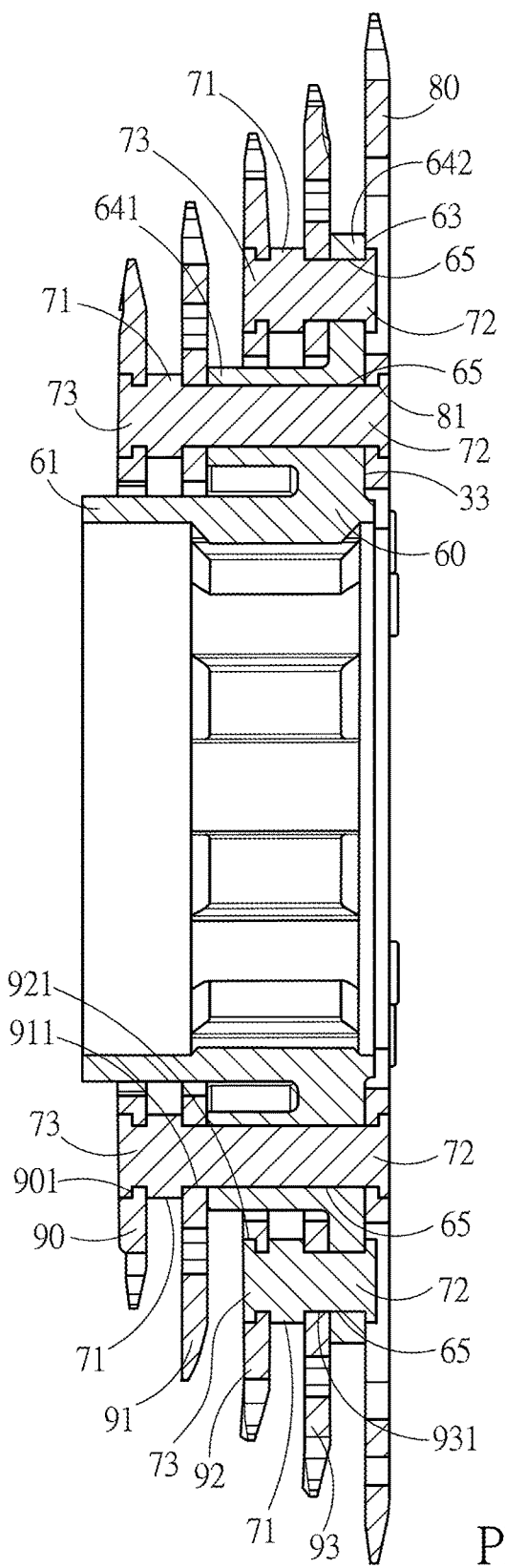
FIG. 2 is a structural sectional view of the bicycle cogset according to Taiwan utility model patent No. M451318 in the prior art.
Figure 3:
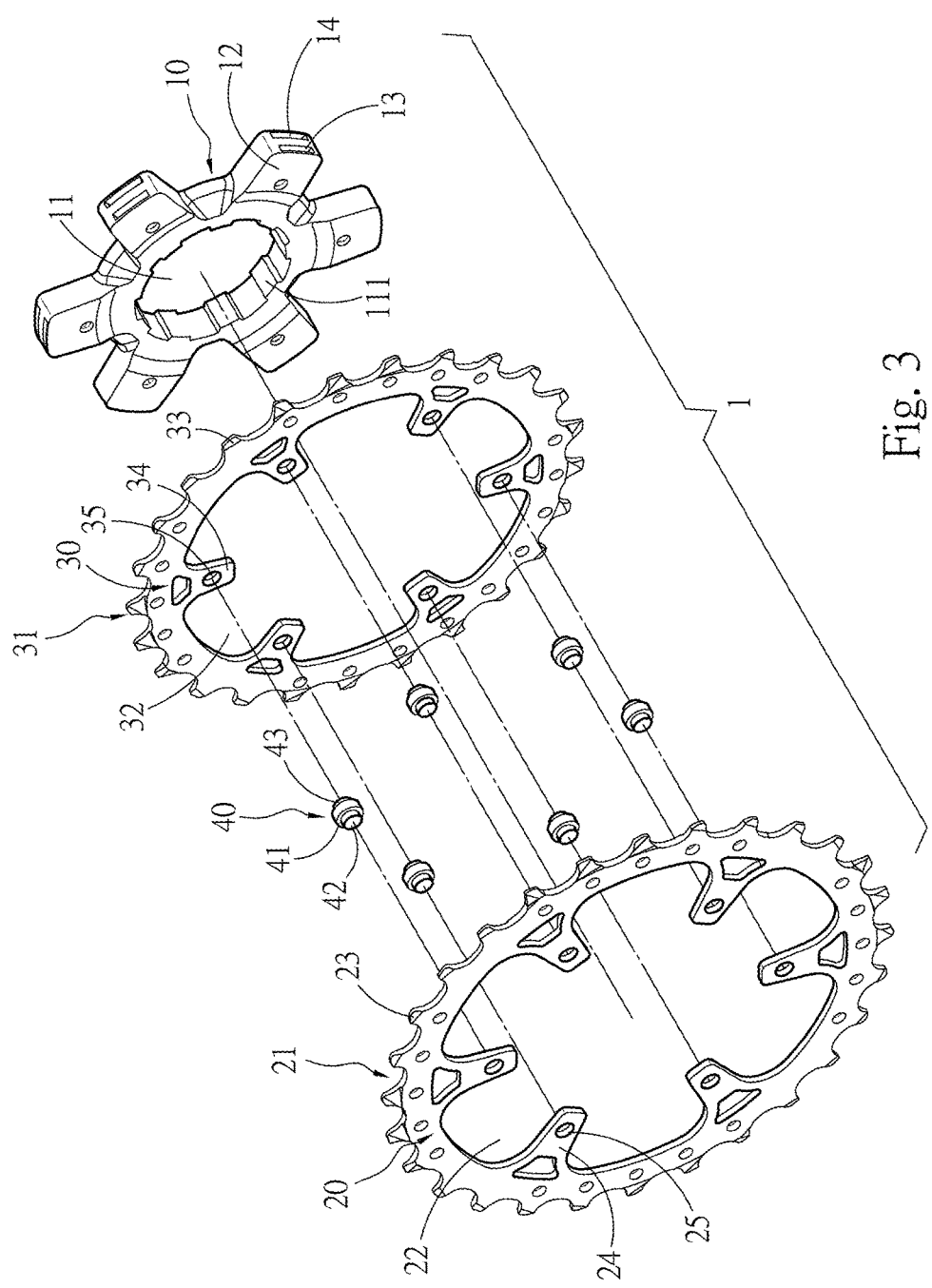
FIG. 3 is an exploded three-dimensional diagram according to an embodiment of the present invention.

It should be noted that, the present invention has the advantage of simple structure, and combines the first sprocket 20, the second sprocket 30, and the sprocket base 10 together in a non-riveting manner. Therefore, compared with the prior art shown in FIG. 1 and FIG. 2, the present invention is lighter in weight, lower material and assembly costs, and is more competitive in the market. In addition, the sprocket base 10 of the present invention can be made of ABS, carbon fiber, or thermosetting resin according to the different requirement in environment and cost. Therefore, the present invention is further advantageous in lighter weight and cost reduction compared with an ordinary one made of metal.

Although the present invention is disclosed above by using preferred embodiments, a person skilled in the art should understand that the embodiments are merely used to describe the present invention and should not be explained as a limitation to the scope of the present invention. It should be noted that, variations and replacements equivalent to the embodiments shall fall within the scope of the present invention. Therefore, the protection scope of the present invention should be subject to the scope of the claims below.

What is claimed is:

1. A bicycle cogset, which is combined with a sleeve of a rear hub of a bicycle, comprising:
   a sprocket base, having a combination hole used for combining with the sleeve, wherein a periphery of the sprocket base is provided with a plurality of connecting arms, and each outer end of the connecting arms is provided with at least one first connection hole and at least one second connection hole;
   a first sprocket, having a first outer portion and a first inner portion, wherein the first outer portion is provided with a plurality of first teeth, the first inner portion is provided with a plurality of first insertion members, and the first insertion members are inserted in the first connection holes; and
   a second sprocket, having a second outer portion and a second inner portion, wherein the second outer portion is provided with a plurality of second teeth, the second inner portion is provided with a plurality of second insertion members, and the second insertion members are inserted in the second connection holes.

2. The bicycle cogset according to claim 1, further comprising a plurality of columnar connecting elements, the plurality of columnar connecting elements comprising a flange, a first pin and a second pin, wherein the flange is disposed between the first pin and the second pin, the first pin and the second pin extend respectively from different sides of the flange, an outer diameter of the flange is larger than an outer diameter of the first pin and an outer diameter of the second pin, each of the first insertion members is provided with a first pin hole, each of the second insertion members is provided with a second pin hole, the first pin is disposed in the first pin hole, and the second pin is disposed in the second pin hole.

3. The bicycle cogset according to claim 2, wherein the plurality of columnar connecting elements are completely embedded in the sprocket base.

4. The bicycle cogset according to claim 2, wherein the plurality of columnar connecting elements are inserted in the first sprocket and the second sprocket for connecting the first sprocket and the second sprocket.

5. The bicycle cogset according to claim 1, wherein the first sprocket is larger than the second sprocket, and the number of the plurality of first teeth of the first sprocket is greater than the number of the plurality of second teeth of the second sprocket.

6. The bicycle cogset according to claim 1, wherein the combination hole has a plurality of protrusions, and the protrusions are used for being engaged with the sleeve of the bicycle.

7. The bicycle cogset according to claim 1, wherein the connecting arms are arranged on a peripheral edge of the sprocket base, the first insertion members of the first sprocket are arranged on the first inner portion of the first sprocket, and the second insertion members of the second sprocket are arranged on the second inner portion of the second sprocket, wherein each of the first insertion members and each of the second insertion members are disposed respectively to each of the connecting arms.

8. The bicycle cogset according to claim 1, wherein the sprocket base is made of a nonmetallic material.

9. The bicycle cogset according to claim 1, wherein the sprocket base, the first sprocket, and the second sprocket are inseparably assembled together in an operating state.

* * * * *